United States Patent [19]
Hakuta et al.

[11] Patent Number: 6,107,747
[45] Date of Patent: Aug. 22, 2000

[54] SELF BALLASTED FLUORESCENT LAMP AND LIGHTING FIXTURE

[75] Inventors: Shinya Hakuta; Hajime Osaki, both of Kanagawa-ken, Japan

[73] Assignee: Toshiba Lighting & Technology Corporation, Tokyo, Japan

[21] Appl. No.: 09/282,429

[22] Filed: Mar. 31, 1999

[51] Int. Cl.[7] .................................................. H05B 37/02
[52] U.S. Cl. ................................ 315/209 R; 315/200 R; 315/291
[58] Field of Search .............................. 315/200 R, 224, 315/219, 206, 291, DIG. 7, 209 R

[56] References Cited

U.S. PATENT DOCUMENTS

5,343,122  8/1994  Sugimori et al. ................ 315/209 R

*Primary Examiner*—David H. Vu
*Attorney, Agent, or Firm*—Pillsbury Madison & Sutro LLP

[57] ABSTRACT

A self ballasted fluorescent lamp includes a rectifier which full wave rectifies AC power from a commercial source. A smoothing capacitor smoothes the rectified power. The smoothed, rectified power is provided to a high frequency generating circuit which drives the fluorescent lamp. The capacitance value C of the smoothing capacitor is selected such that $W \geq \alpha C$, where W (in watts) is the rated service power of the fluorescent lamp, and $\alpha$ is related to a ratio of W to C0 (in $\mu F$). C0 is a capacitance value of the smoothing capacitor for which the 5th harmonic component of the input current is 61% of the fundamental component of the input current when the fluorescent lamp operates under fixed conditions. When the above condition is met, the percentage of harmonic content falls within IEC standards, etc.

5 Claims, 8 Drawing Sheets

SELF BALLASTED FLUORESCENT LAMP AND LIGHTING FIXTURE

INCORPORATION BY REFERENCE

This application claims priority from Japanese Patent Application 10-87562 filed Mar. 31, 1998 and 11-49499 filed Feb. 26, 1999, the contents of which are incorporated herein by reference.

BACKGROUND OF THE INVENTION

1. Field of the Invention

The present invention relates to a self ballasted fluorescent lamp and a lighting fixture which supplies high frequency energy to the fluorescent lamp.

2. Description of Related Art

Circuits for driving fluorescent lamps which include noise prevention elements are well known. For example, an inductor can be connected in series between the AC power supply and a shaping circuit which rectifies the AC power, and a smoothing capacitor can be connected across the AC power supply between the AC power supply and the inductor. Hereinafter, this driving circuit will be referred to as "prior art 1". Such a noise prevention circuit limits the flow of high frequency energy from a high frequency generating circuit within the driving circuit for the fluorescent lamp into the commercial AC power supply. Moreover, the generation of higher harmonic components on the input current can be reduced by limiting the starting current by connecting an impedance, such as a resistance, in series with the smoothing capacitor.

Japanese Provisional Publication No.5-174986 (hereinafter referred to as "prior art 2") discloses discharge lighting equipment which is also equipped with a smoothing circuit including a capacitor input system equipped with an electrolytic capacitor connected in parallel with a series connected noise prevention circuit and shaping circuit. In this discharge lighting equipment, the capacitance of the electrolytic capacitor is small so as to decrease the higher order harmonics generated by the high frequency source.

It has also become necessary to consider the influence of the higher order harmonics from the high frequency generator of a self ballasted fluorescent lamp on the commercial power supply. For an input power of about 35 W, an IEC (International Electrical Commission) standard requires that the 3rd harmonic component of the input current must be 86% or less of the fundamental component of the input current and the 5th harmonic must be 61% or less of the fundamental component of the input current.

Although prior art 1 discussed above includes an inductance for deterring high frequency noise and an impedance element for reducing the charging current of the smoothing capacitor and therefore, reducing higher harmonics, there is a problem that the higher harmonics cannot be controlled well enough in view of the size of the smoothing capacitor. Moreover, although prior art 2 includes a high frequency generator which can be used for a fluorescent lamp of about 40 W, since the number of parts and cost is greater than other designs, applying this design to self ballasted fluorescent lamps of not more than 35 W is difficult in commercial practice.

SUMMARY OF THE INVENTION

Accordingly, the present invention provides a self ballasted fluorescent lamp and a lighting fixture which has a self ballasted fluorescent lamp. The lamp is equipped with a high frequency generating circuit which reduces higher harmonics to meet regulations defined by the IEC standard, for example.

A self ballasted fluorescent lamp of the present invention includes a fluorescent lamp and a ballast.

The ballast includes a circuit to rectify the commercial AC current input to produce a DC current. A smoothing capacitor smooths the DC current from the rectifier circuit. A high frequency generating circuit is connected in parallel with the smoothing capacitor and changes the DC current into a high frequency AC current. The capacitance C of the smoothing capacitor is chosen so that the 5th harmonic of the input current applied from the high frequency generating circuit onto the commercial AC power source is 61% or less of the fundamental component of the input commercial AC current when the fluorescent lamp is operated at the rated service power W. In the self ballasted fluorescent lamp of the present invention, when the 5th harmonic is 61% or less of the fundamental of the commercial AC input current, the 3rd harmonic is 86% or less of the fundamental of the commercial AC input current.

Various embodiments of the invention will be described in detail with reference to the drawings.

BRIEF DESCRIPTION OF THE DRAWINGS

The invention will be described in more detail below with reference to the following figures.

Throughout the various figures, like reference numerals designate like or corresponding parts or elements. Duplicative description will be avoided as much as possible.

DETAILED DESCRIPTION OF THE PREFERRED EMBODIMENTS

Unless otherwise specified, definitions of terms and technical meanings are as shown below.

A self ballasted fluorescent lamp should have a rated service power smaller than about 35 W, as set, for example, in the IEC standard. However, the lamp may exceed a rated power of 35 W. Commercial AC current, voltage or power refers to the general home use AC current, voltage or power supplied from the power company with a frequency of 60 Hz and an effective voltage of about 120 V in the U.S. The circuits for self ballasted fluorescent lamps which are used abroad need to be adjusted so that the teachings of this invention may be applied.

Although rectification circuits having a diode bridge and a shaping circuit are common, other rectification circuits can be used in the present invention.

Although an electrolytic capacitor is suitable as the smoothing capacitor, any type of capacitor can be employed in this invention. A high frequency generating circuit changes DC current into a high frequency current. "High frequency" means a frequency of about 1000 Hz or more.

This invention can be used with a hot cathode type or cold cathode type fluorescent lamp. Moreover, the fluorescent lamp of the present invention may use an emitter applied to the electrode, a ceramic electrode, or a cold cathode with thermal spraying.

Rated service power W of a self ballasted fluorescent lamp means the power consumed by the entire self ballasted fluorescent lamp including the high frequency generating circuit. The high frequency generating circuit can generate a high frequency current with or without a DC offset. The form of the high frequency current and the rated power can be arbitrarily selected. A ballast is required to compensate for the negative impedance characteristic of the fluorescent lamp and may be, for example, an inductance connected in series with the fluorescent lamp as a current-limiting impedance.

When using an inductance as a current-limiting impedance, a small feedback element can be included in the form of a magnetic element in combination with an auxiliary winding of the impedance. The auxiliary winding is a part of the drive circuit which controls a switching element which causes the high frequency generating circuit to oscillate, by supplying energy for self-oscillation. However, any feedback element may be employed. In fact, the feedback element is not necessary. Moreover, a series resonance circuit which includes the current-limiting inductance can be added, and the operating frequency of the high frequency generator can be regulated.

Furthermore, the fluorescent lamp may be connected to the AC commercial power source through an isolation transformer. However, the fluorescent lamp can be connected without using the insulation transformer. This effectively miniaturizes the self ballasted fluorescent lamp. In addition, when connecting directly, it is good to use a coupling capacitor in series with the fluorescent lamp to eliminate DC current flowing to the fluorescent lamp from the AC commercial power source.

When using a hot cathode filament for the electrode of the fluorescent lamp, either of two different methods can be used to heat the filament electrode during starting. The first method includes connecting a resonance capacitor in parallel with the fluorescent lamp through at least one filament electrode during starting. Then, since the current through the current-limiting inductance and the resonance capacitor also flows through the filament during starting, the filament is heated. Since the current-limiting inductance and the resonance capacitor resonate relatively well, the voltage across the resonance capacitor becomes high, starting the fluorescent lamp.

The second method for heating the filament during starting uses a transformer. Although the filament heating transformer may be formed apart from the current-limiting inductance, the current-limiting inductance can be magnetically coupled to a filament heating winding. This minimizes the number of necessary parts.

Either one or both filament electrodes do not need to be heated before starting the lamp and in fact, do not need to be heated at all.

Next, the theory of operation of the present invention will be explained.

The present inventors have experimented in order to determine a design for a self ballasted fluorescent lamp which meets the regulations of the IEC standard, etc. They have determined that the percentage of higher harmonics in the input current to the fluorescent lamp is related to the ratio of the rated service power W (W) of the self ballasted fluorescent lamp and the capacitance C ($\mu$F) of the smoothing capacitor.

The present inventors have determined that:

$$W = \alpha C_0 \quad \text{[Formula (1)]}$$

wherein: 1) W (W) is the rated service power of the fluorescent lamp, 2) C0 ($\mu$F) is the value of the smoothing capacitance that is necessary to cause the content of the 5th harmonic component of the input current to be 61% of the fundamental component of the input current, and 3) $\alpha$ is a constant when the voltage of the commercial AC power is fixed. This formula holds when W is within the range of 3–35 Watts.

In order to make the content of 5th harmonic component of the input current 61% or less of the fundamental component of the input current, the inventors investigated the capacitance of the smoothing capacitor. They determined that the percentage of higher harmonics fell when the capacitance C of the smoothing capacitor of self ballasted fluorescent lamp is made small. In order to keep the 5th harmonic component under the above threshold, they determined that the capacitance of the smoothing capacitor is C ($\mu$F) should be selected so that the following equation holds:

$$W \geq \alpha C \quad \text{[Formula (2)]}$$

Formula 2 can satisfied when W is within the range of 3–35 Watts. The proportionality coefficient $\alpha$ depends on the commercial AC voltage V.

When the 5th harmonic component is 61% or less of the fundamental experiments have determined that the 3rd harmonic component of the input current becomes 86% or less of the fundamental component of the input current.

Moreover, the inventors have determined that capacitance C of the smoothing capacitor can meet the requirements of formula (2) and still have a value greater than the minimum necessary to keep ripple sufficiently low so that the fluorescent lamp is not extinguished every half-cycle of the commercial AC voltage. When the lamp is extinguished during every half-cycle, it is necessary to provide sufficient power to restrike the lamp and this restrike power represents an energy loss. It should be noted that this minimum value of capacitance C, which prevents extinguishing of the lamp, is what a designer may arbitrarily determine to be for a fluorescent lamp etc., but is not an essential part of this invention.

Figure 1:
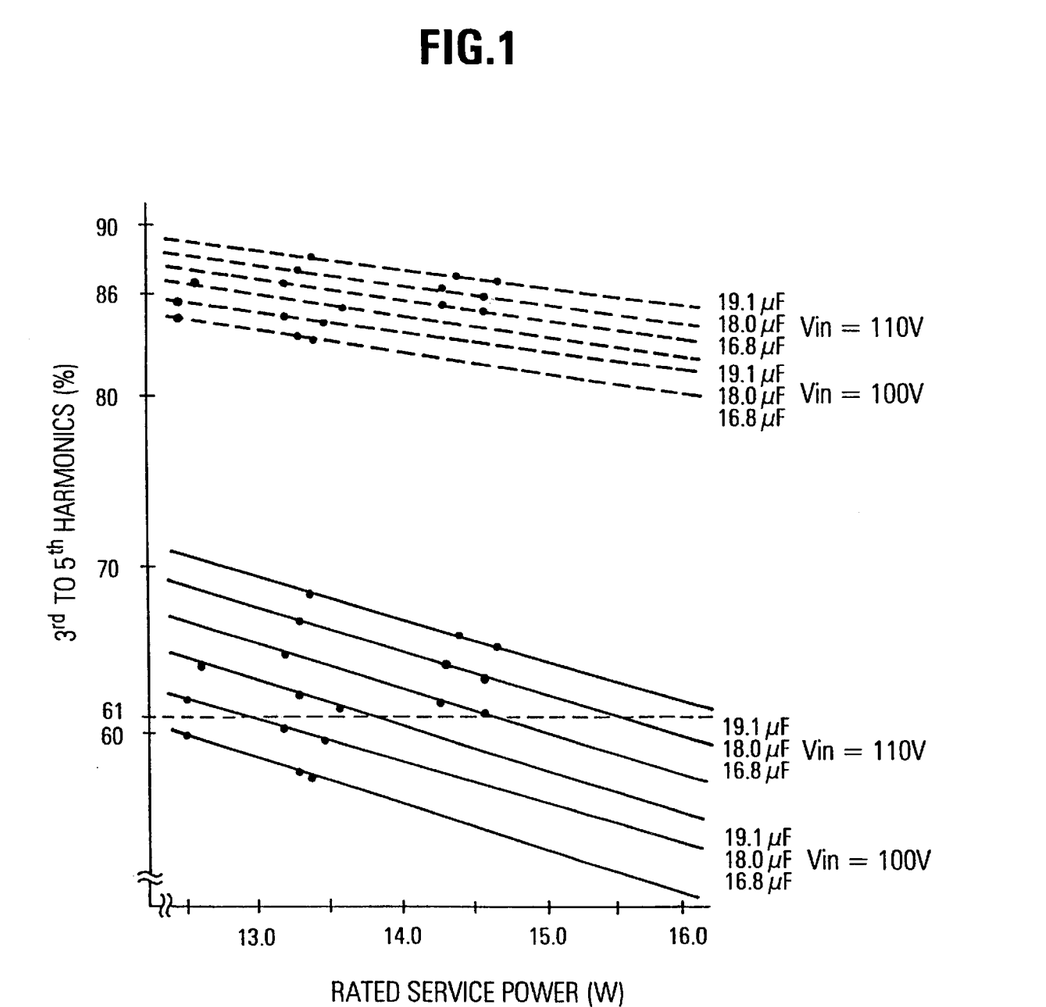
FIG. 1 is a graph which shows the relation between the rated service power of self ballasted fluorescent lamp and the percentage content of the 3rd and 5th harmonics.

FIG. 1 shows the relation between the rated service power of a self ballasted fluorescent lamp and the percentage of content of the 3rd and 5th harmonic components relative to the fundamental component of the input current as the capacitance C of the smoothing capacitor is changed. In the experiments resulting in FIG. 1, the commercial AC voltage was set to 60 Hz, and the input effective voltage Vin was set to 100 V and 110 V. In this figure, the percentage content of the 5th harmonic is shown in solid line, and the percentage content of the 3rd harmonic is shown in dotted line.

According to FIG. 1, the percentage content of the 5th harmonic is correlated with the percentage content of the 3rd harmonic. The Figure shows that the rate of change of the percentage of the 5th harmonic with a change in the rated service power of the fluorescent lamp circuit is larger than the rate of change of the percentage of the 3rd harmonic with a change in the rated service power.

Figure 2:
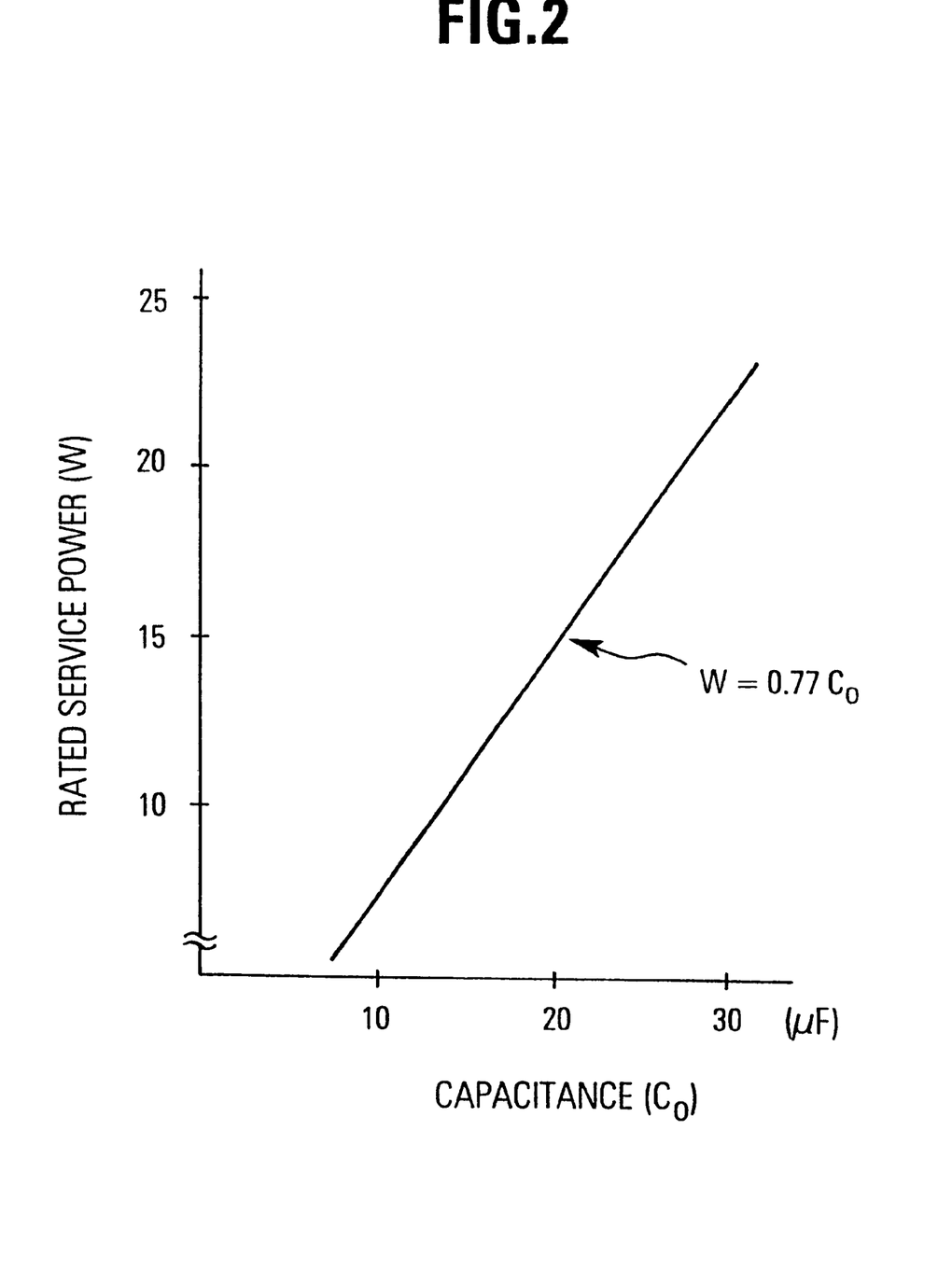
FIG. 2 is a graph which shows the relation of the capacitance C0 of the standard smoothing capacitor and rated service power W of a self ballasted fluorescent lamp for which the percentage content of the 5th harmonic becomes 61%.

FIG. 2 shows the relation of the capacitance C0 to the rated service power W of a self ballasted fluorescent lamp. C0 is the value of the smoothing capacitor that causes the percentage content of the 5th harmonic relative to the fundamental in the input current to be 61%, on the basis of FIG. 1. The relation of formula (2) is also shown in FIG. 2. In order to make the percentage content of the 5th harmonic of a self ballasted fluorescent lamp 61% or less, it is necessary to select a value C for the smoothing capacitor which is below the solid line in FIG. 2.

Figure 3:
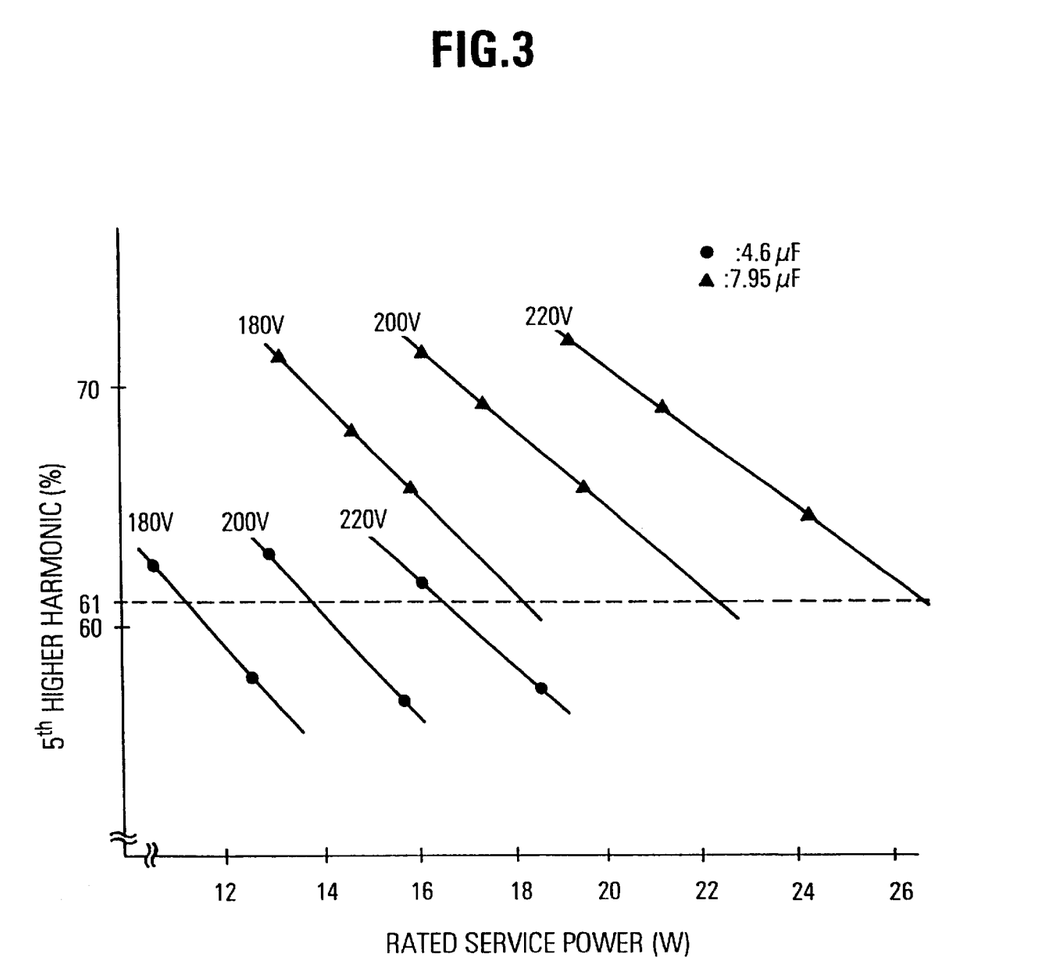
FIG. 3 is a graph which shows the relation between the rated service power of a self ballasted fluorescent lamp and the percentage content of the 3rd harmonic for two values of capacitance C of the smoothing capacitor.

FIG. 3 shows the relation between the rated service power of a self ballasted fluorescent lamp, and the percentage content of the 5th harmonic for two different values for capacitance C of the smoothing capacitor. For FIG. 3, the commercial AC voltage was 60 Hz, and the input effective voltage Vin was 180 V, 200 V, and 220 V.

Figure 4:
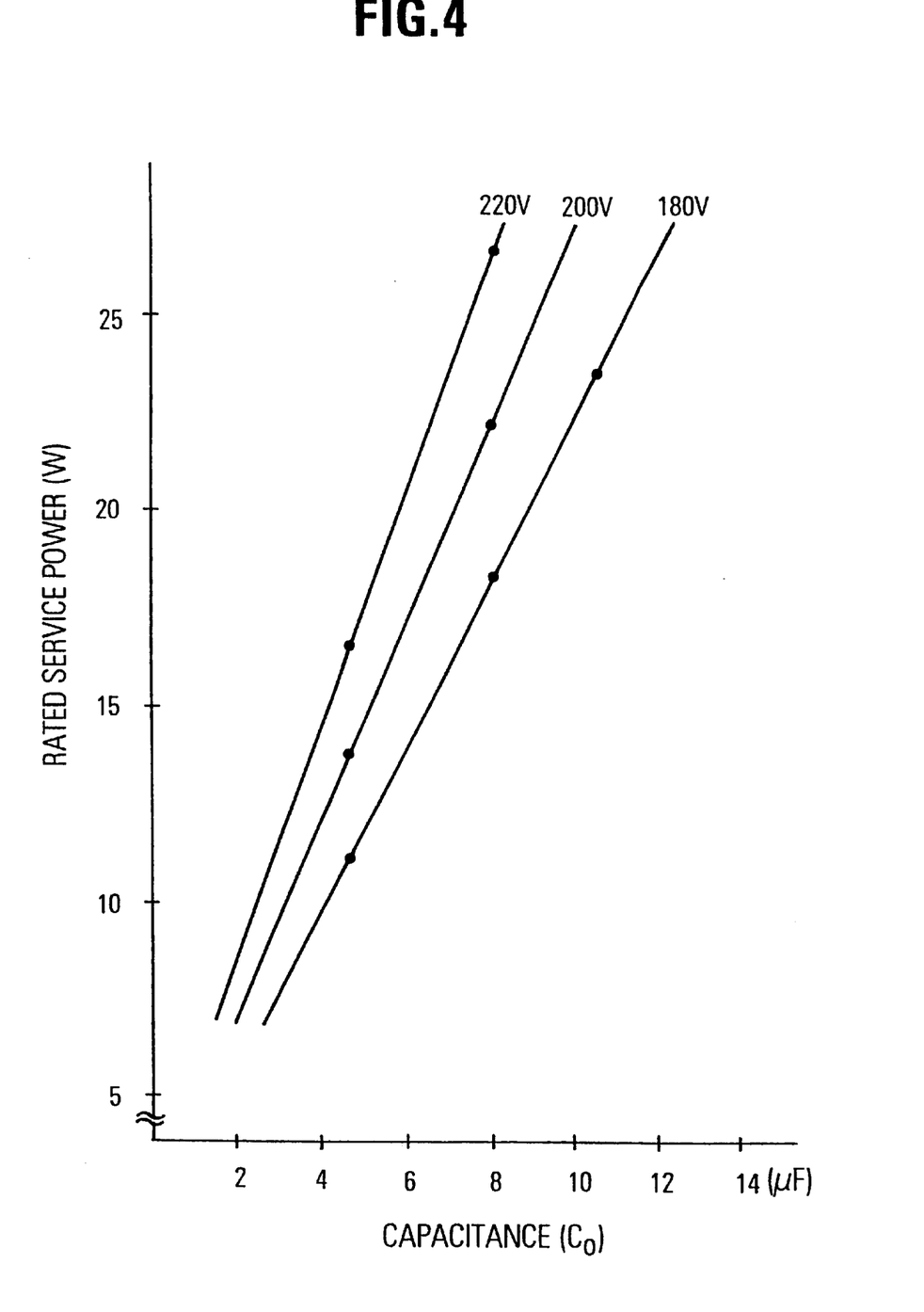
FIG. 4 is a graph which shows the relation between the capacitance C0 of the standard smoothing capacitor and rated service power W of a self ballasted fluorescent lamp for which the percentage content of the 5th harmonic becomes 61% on the basis of the result of FIG. 3.

FIG. 4 shows the relation of the capacitance C0 to the rated service power W of a self ballasted fluorescent lamp from which the percentage content of the 5th harmonic is 61%, on the basis of FIG. 3. The graph of FIG. 4 is similar to FIG. 2, but based on the data of FIG. 3. In order to make the percentage content of the 5th harmonic in a self ballasted fluorescent lamp 61% or less, it is necessary to select a value for capacitance C of the smoothing capacitor which is below the solid line.

Figure 5:
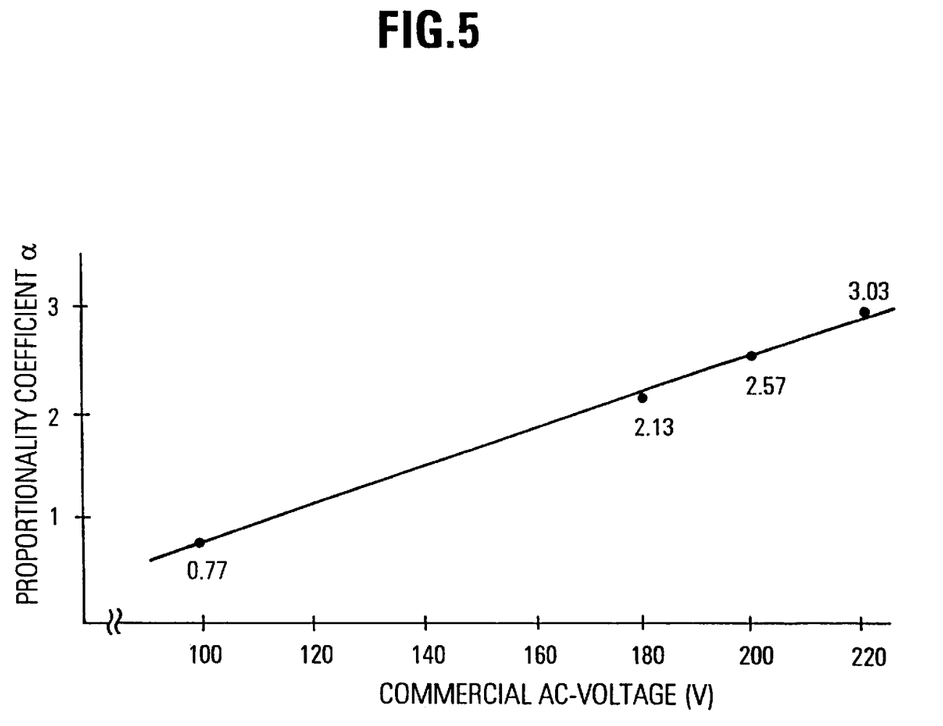
FIG. 5 is a graph which shows the relation of proportionality coefficient $\alpha$ and commercial AC voltage.

The present inventors have also determined by experiment that the proportionality coefficient $\alpha$ between rated service power W of the fluorescent lamp and capacitance C of the smoothing capacitor will change as the commercial AC voltage V is changed. FIG. 5 shows the relationship between proportionality coefficient $\alpha$ and commercial AC voltage V. From FIGS. 2 and 4, proportionality coefficient $\alpha$, for an AC commercial voltage of 100 V is 0.77 and proportionality coefficient $\alpha$, for an AC commercial voltage of 200 V is 2.57. Therefore, proportionality coefficient $\alpha$ is related to V as follows:

$$\alpha = (0.018\ V - 1.03) \quad \text{[Formula (3)]}$$

By combining formulas (3) and (2), the following formula results:

$$W \geq (0.018\ V - 1.03)C \quad \text{[Formula (4)]}$$

Proportionality coefficient $\alpha$, at an AC commercial voltage of 180 V, is 2.13 as shown in FIG. 5. Proportionality coefficient $\alpha$, at AC commercial voltage 220 V, is 3.03 This is in line with formula (4). These voltage values cover the current range of common AC voltages. Over this range, the relationship in formula (4) can be met. According to the present invention, the proportionality coefficient, by which capacitance C of the smoothing capacitor is multiplied, can be selected according to the appropriate commercial AC voltage V. Even if the commercial AC voltage varies, capacitance C of the smoothing capacitor can be selected easily and regulation defined by IEC standard etc. can be met.

When the commercial voltage is 100 V, then the following formula applies:

$$W \geq 0.77 C.$$

Preferred embodiments of the present invention will be described with reference to the accompanying drawings.

Figure 6:
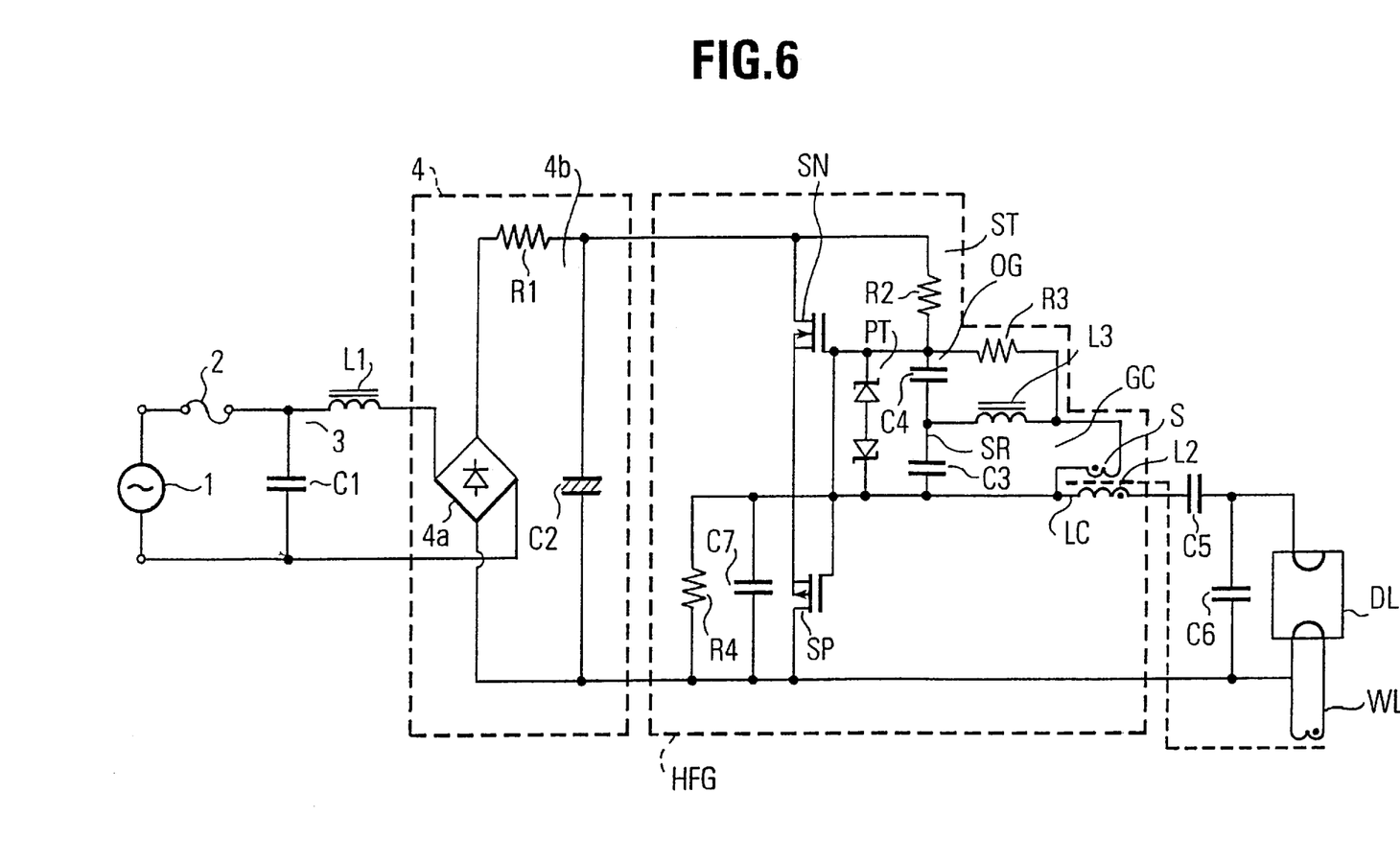
FIG. 6 is a circuit diagram showing a first embodiment of a self ballasted fluorescent lamp of the present invention.

A first embodiment of the present invention will be explained with reference to FIGS. 6–7. FIG. 6 is a circuit diagram showing the first embodiment of a self ballasted fluorescent lamp of the present invention. An AC power supply 1 is the commercial 100 V AC power supply. An over-current fuse 2 may be formed, for example, on a printed circuit board as a part of the wiring pattern so that it melts when excessive current flows. A noise prevention circuit 3 includes an inductance L1, which is connected in series between the AC power supply 1 and a rectifier DC power supply 4, and a capacitor C1 which is connected in parallel with the AC power supply 1. The noise prevention circuit 3 prevents high frequency from flowing into the commercial power supply. The rectifier DC power supply 4 includes a bridge full wave shaping circuit 4a and a smoothing circuit 4b. An AC input terminal is connected to the AC power supply 1, and a DC output terminal is connected to bridge circuit 4a. Smoothing circuit 4b includes a series resistance R1 and a smoothing capacitor C2. When the rated service power of the self ballasted fluorescent lamp is 13 W, the capacitance of the smoothing capacitor C2 is 16 $\mu$F, and the capacitance is set to 27 $\mu$F when the rated service power is 23 W. A resistance value of several ohms or less for resistance R1 reduces the charging current flowing into the smoothing capacitor C2, and reduces higher harmonic components produced by the circuit.

The drain of N channel type FET SN is connected to the plus terminal of the smoothing capacitor C2. The source of P channel type FET SP is connected to the source of N channel type FET SN. The drain of P channel type FET SP is connected to the minus terminal of the smoothing capacitor C2. The gate circuit GC for the FETs SN and SP includes feedback element s, series connected resonance circuit SR, and gate voltage output circuit OG. Feedback element s is magnetically coupled to a current-limiting inductance L2. The resonance circuit SR is formed by an inductance L3 and a series connected capacitor C3. Opposite ends of the series connected components are connected to opposite ends of feedback element s.

Gate voltage output circuit OG is formed so that the resonance voltage which appears across the capacitor C3 is transferred through a capacitor C4. The other end of capacitor C4 is connected to the gate of each of N channel type FET SN and P channel type FET SP. Furthermore, the end of the capacitor C3 not connected to inductance L3 is connected with each source of FETs SN and SP. Thus, the resonance voltage which appears across the capacitor C3 is applied between the gate of each FET SN and SP and the source of each FET SN and SP through gate voltage output circuit OG.

A starting circuit ST includes resistances R2, R3, and R4. One end of resistance R2 is connected to one end of resistance R3 and capacitor C4 at the gates of FETs SN and SP. The other end of resistance R2 is connected to the plus terminal of the smoothing capacitor C2. The other end of resistance R3 is connected to the inductance L3 and feedback element s. Resistance R4 is connected between the connecting point between FETs SN and SP and the minus terminal of the smoothing capacitor C2.

A gate protection circuit PT includes series connected Zener diodes having reverse polarity which are connected to gate voltage output circuit OG.

The fluorescent lamp circuit LC includes a fluorescent lamp DL which is the load of the circuit, a current-limiting inductance L2, capacitive coupling capacitor C5, and a resonance capacitor C6. The rated service power of the self ballasted fluorescent lamp containing the fluorescent lamp circuit LC is 23 W. One electrode of the fluorescent lamp DL is connected to the end of the capacitor C5. The fluorescent lamp circuit LC forms a series connected resonance circuit which consists of the current-limiting inductance L2, the capacitor C5, and the resonance capacitor C6.

A filament heating winding wh is connected in parallel with the other electrode. The filament heating winding wh is magnetically coupled to the current-limiting inductance L2, and it heats the electrode. Alternatively, the filament heating winding wl can be eliminated. To heat the lower electrode of lamp DL, the lower terminal of resonance capacitor C6 may be disconnected from the power supply side terminal of the lower electrode and connected instead to the non-power supply side terminal of the lower electrode. The second arrangement produces results similar to the first arrangement. The filament electrode is heated by the current which flows through the resonance capacitor C6.

The capacitor C7 is connected between the source and drain of P channel type FET SP. The capacitor C7 smoothes the switching of P channel type FETSP.

Next, the operation of this embodiment is explained. When AC power is supplied from the AC power supply 1, a DC voltage smoothed by the rectifier DC power supply 4 will appear across the smoothing capacitor C2. The DC voltage is applied across the drains of N channel type FET SN and P channel type FET SP. However, since no gate voltage has been applied to FETs SN and SP, FETs SN and SP are still in their OFF states.

The starting circuit ST also receives the DC voltage. Therefore, a divided voltage appears across resistance R3 based on the values of resistances R2, R3, and R4. This creates a positive voltage across each gate and source of FET SN. Consequently, N channel type FET SN is turned on. However, since the necessary gate voltage is of a reverse polarity, the voltage applied between the gate and source of P channel type FET SP causes this FET to remain in the OFF state.

When the N channel type FET SN turns on, current will flow through the fluorescent lamp circuit LC including current-limiting inductance L2, capacitor C5, and capacitor C6. The series connected resonance circuit of the current-limiting inductance L2, the capacitor C5, and the capacitor C6 resonates, and the terminal voltage of the resonance capacitor C6 becomes high. When current flows through the current-limiting inductance L2, a voltage is magnetically induced across feedback element s and filament heating winding wh. As a result of the voltage induced across feedback element s, the resonance circuit SR starts to resonate. The resonance causes a negative voltage to appear across the capacitor C3 which is regulated by the gate protection means PT. The negative voltage is applied across each gate and source of P channel type FET SP and N channel type FET SN through the gate protection means PT. As a result, the P channel type FET SP is turned on. However, the negative voltage turns off N channel type FET SN. As a result of the electromagnetic energy accumulated in the current-limiting inductance and the electric charge stored in the capacitor C6, the current will flow to the opposite direction when P channel type FET SP turns on. Since the current-limiting inductance L2 induces an AC voltage in the filament heating winding wh in the fluorescent lamp DL, the corresponding electrode of the lamp is heated.

Since a high resonance voltage appears across the resonance capacitor C6, the fluorescent lamp DL is lit. Since the same current which flowed through the starting circuit ST to feedback element s also flows when P channel type FET SP turns on, N channel type FET SN turns on again and P channel type FET SP turns off. Since FETs SN and SP alternately turn on and off, the fluorescent lamp DL is lit by high frequency current.

In this embodiment, commercial AC voltage is 100 V. The relation of capacitance C of the smoothing capacitor C2, and rated service power W of the fluorescent lamp circuit LC is $W \geq 0.77C$. Therefore, the percentage content of the 5th harmonic component of the input current is 61% or less of the fundamental component, and the percentage content of the 3rd harmonic component can be made 86% or less of the fundamental component.

Figure 7:
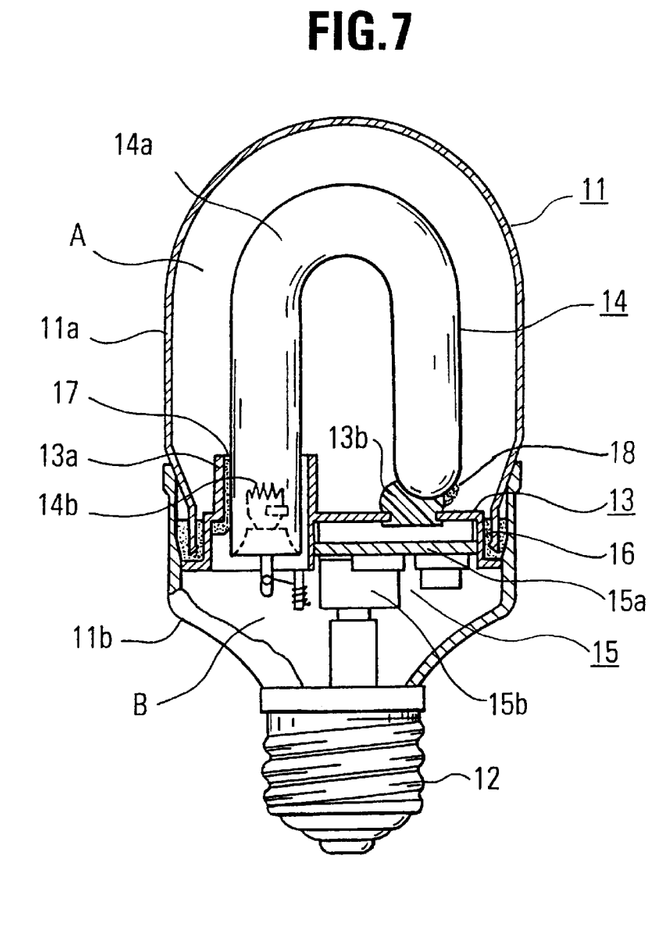
FIG. 7 is a view, partially in section, of a first embodiment of a self ballasted fluorescent lamp according to the present invention.

FIG. 7 shows a first embodiment of a self ballasted fluorescent lamp of the present invention. The rated service power of the self ballasted fluorescent lamp is 23 W. A vessel 11 includes a transparent globe 11a and shading base 11b. Transparent globe 11a is made from glass and can have a translucent layer on the inside. Shading base 11b is cup-shaped and is made of synthetic resin. Shading base 11b is equipped with a base 12, and transparent globe 11a is attached at the open end of shading base 11b using silicone adhesives 16. A partition 13 is white synthetic and is fixed to the open end of base 11b with the silicone adhesives 16. The partition 13 divides the inside of the vessel 11 into a luminescence chamber A and a circuit receiving chamber B. Moreover, a fluorescence arc tube hole 13a, silicone adhesives filling hole 13b, etc. are formed in the partition 13.

Fluorescent arc tube 14 includes bulb 14a, an electrode 14b at each end of bulb 14a, a phosphor layer, and a discharge medium. Bulb 14a is a long and slender glass pipe with a diameter of 12 mm which is bent in a saddle shape. Each electrode 14b is a hot cathode. The phosphor layer is formed on the inside of bulb 14a. The discharge medium includes a rare gas at a pressure of 0–10 torr. For example, the discharge medium can include mercury and argon. Both ends of the fluorescent arc tube 14 are inserted in fluorescent arc tube hole 13a of the partition 13 from the luminescence chamber A side, and the tube 14 is fixed to the partition 13 with silicone adhesives 17 so as to be supported and arranged in luminescence chamber A of the vessel 11. Moreover, the partition 13 is adhered to the middle part of the fluorescent arc tube 14 with silicone adhesives 18 which are applied through silicone adhesives filling hole 13b.

A lighting circuit unit 15 includes circuit parts 15b mounted on a printed circuit board 15a and is arranged in circuit receipt chamber B of the vessel 11. Moreover, the lighting circuit unit 15 comprises the fluorescent lamp lighting equipment shown in FIG. 6. The fluorescent arc tube 14 is equivalent to the fluorescent lamp DL in FIG. 6. The base 12 is connected to the input end of the lighting circuit unit 15, and the output end of the lighting circuit unit 15 is connected to electrodes 14b of the fluorescent arc tube 14.

Figure 8:
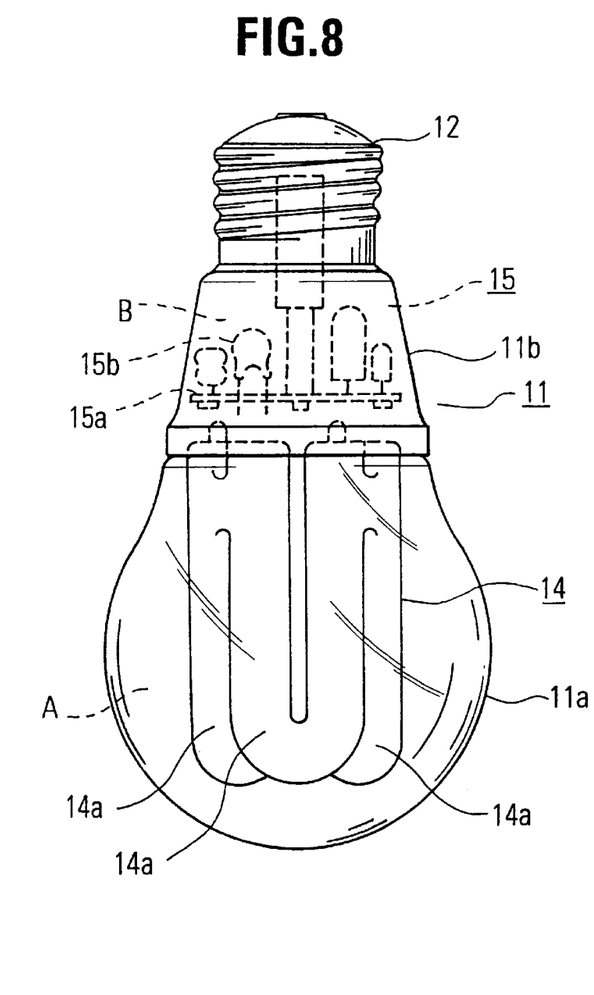
FIG. 8 is a view, of a second embodiment of a self ballasted fluorescent lamp according to the present invention.

FIG. 8 shows a second embodiment of a self ballasted fluorescent lamp of the present invention. This embodiment is the same as the first embodiment except as described below. The rated service power of this self ballasted fluorescent lamp is 13 W and has a height including the base of about 123 mm. The vessel 11 includes a transparent globe 11a and shading base 11b. The shape of globe 11a looks like that of an incandescent electric. The maximum diameter is about 60 mm. Shading base 11b is cup-shaped and is made of synthetic resin. The shading base 11b is equipped with a base 12, and transparent globe 11a is attached at the open end of shading base 11b using silicone adhesives (not shown). The open end of base 11b is equipped with the a partition (not shown), which divides the inside of the vessel 11 into a luminescence chamber A and a circuit receiving chamber B. Moreover, the partition supports the fluorescence arc tube 14 and is attached to the fluorescent arc tube 14 with silicone adhesives, etc. The fluorescent arc tube 14 includes a bulb 14a, a pair of electrodes (not shown), a phosphor layer and a discharge medium. The bulb 14a is a long slender glass pipe with a diameter of 10 mm bent in the shape of three connected "U" shape portions. The electrodes are hot cathodes with one at each end of the fluorescent arc tube 14.

The lighting circuit unit 15 includes circuit parts 15b mounted on a printed circuit board 15a. A base 12 is connected to the input end of the lighting circuit unit 15, and the output end of the lighting circuit unit 15 is connected to the electrodes of the fluorescent arc tube 14.

Figure 9:
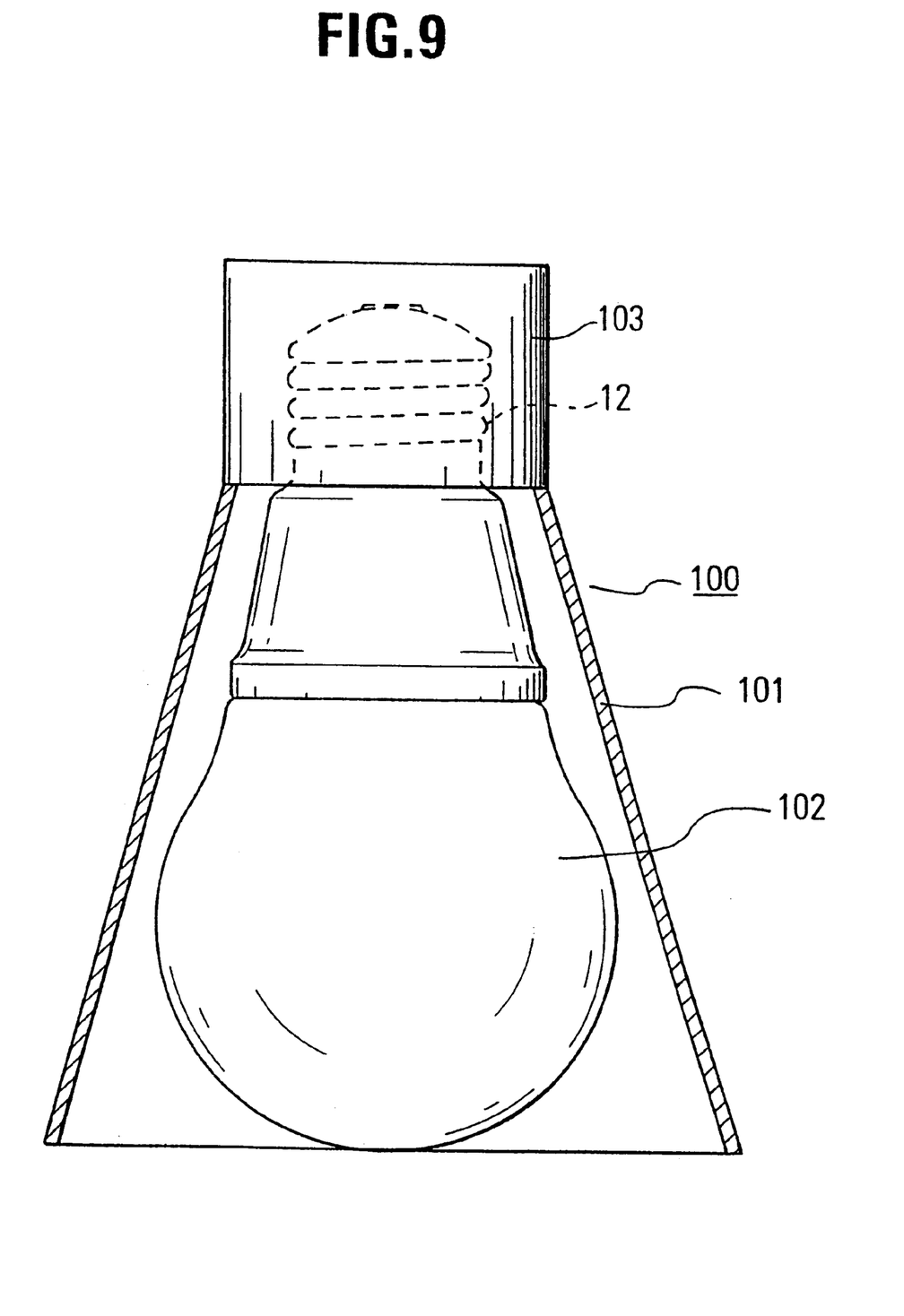
FIG. 9 is a view, sectional partially schematic, of a embodiment of a lighting fixture according to the present invention.

FIG. 9 shows an embodiment of a lighting fixture of the present invention. The lighting fixture main part 100 includes a socket 103 connected to a cone-shaped aluminum reflector 101. Self ballasted fluorescent lamp 102 is the same as that shown in FIG. 8. Base 12 of self ballasted fluorescent lamp 102 is inserted in the socket 103, and is supported by the lighting fixture main part 100.

While the invention has been described in connection with what are presently considered to be the most practical and preferred embodiments, it is to be understood that the invention is not limited to the disclosed embodiments. On the contrary, it is intended to cover various modifications and equivalent arrangements included within the spirit and scope of the appended claims.

What is claimed is:

1. A self ballasted fluorescent lamp comprising:
 a fluorescent lamp; and
 a ballast which provides a high frequency current to the fluorescent lamp, the ballast comprising:
  a rectifier receiving commercial AC current and producing a DC current,
  a smoothing capacitor which smoothes the DC current from the rectifier, and
  a high frequency generating circuit which is connected in parallel to the smoothing capacitor and converts the smooth DC current into the high frequency current,
 wherein a capacitance C of the smoothing capacitor is chosen to cause a 5th harmonic component of the commercial AC current to be 61% or less of a fundamental component of the commercial AC current when the fluorescent lamp is operated at its rated service power W on a commercial AC voltage under a fixed condition.

2. A self ballasted fluorescent lamp comprising:
 a fluorescent lamp;
 a ballast which provides a high frequency current to the fluorescent lamp, the ballast comprising:
  a rectifier receiving commercial AC current and producing a DC current,
  a smoothing capacitor which smoothes the DC current from the rectifier,
  a high frequency generating circuit which is connected in parallel to the smoothing capacitor and converts the smooth DC current into the high frequency current,
 wherein a capacitance C of the smoothing capacitor is selected so that:

$$W \geq \alpha C$$

where W is the rated service power of the fluorescent lamp and $\alpha$ is inversely related to a value C0 of the smoothing capacitor that causes a 5th harmonic component of the commercial AC current to be 61% of a fundamental component of the commercial AC current when the fluorescent lamp is operated at its rated service power W on a commercial AC voltage under a fixed condition.

3. A self ballasted fluorescent lamp comprising:
 a fluorescent lamp; and
 a ballast which provides a high frequency current to the fluorescent lamp, the ballast comprising:
  a rectifier receiving commercial AC current and producing a DC current,
  a smoothing capacitor which smoothes the DC current from the rectifier, and
  a high frequency generating circuit which is connected in parallel to the smoothing capacitor and converts the smooth DC current into the high frequency current,
 wherein, when the rated service power of the fluorescent lamp is set to W (W) the capacitance of the smoothing capacitor is set to C ($\mu$F) and commercial AC voltage is set to V (V), the following formula is satisfied:

$$W \geq (0.018\, v - 1.03)C.$$

4. A self ballasted fluorescent lamp comprising:
 a fluorescent lamp; and
 a ballast which provides a high frequency current to the fluorescent lamp, the ballast comprising:
  a rectifier receiving commercial AC current at 100 V and producing a DC current,
  a smoothing capacitor which smoothes the DC current from the rectifier, and
  a high frequency generating circuit which is connected in parallel to the smoothing capacitor and converts the smooth DC current into the high frequency current,
 wherein, when the rated service power of the fluorescent lamp is set to W (W), and the capacitance of the smoothing capacitor is set to C ($\mu$F), the following formula is satisfied:

$$W \geq 0.77C.$$

5. A lighting fixture comprising:
 a lighting fixture base; and
 a self ballasted fluorescent lamp supported by the lighting fixture base, the self ballasted fluorescent lamp comprising:
  a fluorescent lamp, and
  a ballast which provides a high frequency current to the fluorescent lamp, the ballast comprising:
   a rectifier receiving commercial AC current and producing a DC current,
   a smoothing capacitor which smoothes the DC current from the rectifier, and
   a high frequency generating circuit which is connected in parallel to the smoothing capacitor and converts the smooth DC current into the high frequency current,
  wherein a capacitance C of the smoothing capacitor is chosen to cause a 5th harmonic component of the commercial AC current to be 61% or less of a fundamental component of the commercial AC current when the fluorescent lamp is operated at its rated service power W on a commercial AC voltage under a fixed condition.

* * * * *